United States Patent [19]

Velten et al.

[11] Patent Number: 4,826,793

[45] Date of Patent: May 2, 1989

[54] METHOD OF INCORPORATING SMALL CRYSTALLINE CATALYTIC INGREDIENTS INTO AN ATTRITION-RESISTANT MATRIX

[75] Inventors: Terrance J. Velten, Savannah, Ga.; Edward J. Demmel, Newport Beach, Calif.

[73] Assignee: Intercat, Inc., Sea Girt, N.J.

[21] Appl. No.: 84,685

[22] Filed: Aug. 12, 1987

[51] Int. Cl.[4] .................. B01J 29/04; B01J 37/00
[52] U.S. Cl. ............................. 502/64; 502/68
[58] Field of Search ........................... 502/64, 68

[56] References Cited

U.S. PATENT DOCUMENTS

| | | | |
|---|---|---|---|
| 3,515,680 | 6/1970 | Flank | 502/64 |
| 3,518,206 | 6/1970 | Sowards et al. | 502/64 |
| 3,523,092 | 8/1970 | Kearby | 502/64 |
| 3,702,886 | 11/1972 | Argauer | 423/328 |
| 4,513,091 | 4/1985 | Chang | 502/71 |
| 4,560,542 | 12/1985 | Robson | 423/328 |
| 4,594,332 | 6/1986 | Hoelderich | 502/64 |
| 4,605,637 | 8/1986 | Chang | 502/64 |
| 4,684,475 | 8/1984 | Kuehl | 502/71 |

OTHER PUBLICATIONS

OGJ Report, Oct. 13, 1986, Oil & Gas Journal 39.

*Primary Examiner*—Carl F. Dees
*Attorney, Agent, or Firm*—Dorr, Carson, Sloan & Peterson

[57] ABSTRACT

High concentrations of small (<4 microns) crystalline catalyst ingredients such as ZSM-5, low-soda exchanged Y-zeolite, ultra-stable Y-zeolite etc., can be incorporated into a durable matrix by use of binder formulations prepared from amorphous silica, alumina and zirconia, particularly those of colloidal dimensions. The binder formulations are slurried and associated with at least one active catalyst ingredient, which preferably is up to 60% ZSM-5. The resulting material is then spray-dried and calcined to form binder matrices which are particularly resistant to attrition and particle density change.

48 Claims, 3 Drawing Sheets

4,826,793

METHOD OF INCORPORATING SMALL CRYSTALLINE CATALYTIC INGREDIENTS INTO AN ATTRITION-RESISTANT MATRIX

BACKGROUND OF THE INVENTION

1. Field of the Invention

This invention is generally concerned with blending and processing allotropic forms of silica, alumina and zirconia with those active catalysts commonly employed in petroleum "cracking" processes to form improved binder matrices. More particularly it is concerned with the rapid introduction of catalyst additive concentrates into a bulk of resident catalyst mass without encountering unacceptable attrition or elutriation losses.

2. Description of the Prior Art

The history of the petroleum industry and, consequently, of refining technology, has been that of originally making use of a small part of petroleum and then finding a use for the remainder. Later the industry learned how to chemically alter components of crude petroleum in order to accommodate competing market demands. The first such alteration was accomplished by thermal decomposition in the early 1930's. However, thermal decomposition left much to be desired; in fact it probably created more problems than it solved. In any event, the next most important step in this art was the development of gas oil in the presence of naturally occurring clays, such as kaolins, hollysite and others, in an atmosphere of its own vapor. Later developments included the introduction of synthetic catalysts such as silica-alumina and silica-magnesia and combinations of these materials with the previously employed naturally-occurring clays. Still later it was found that certain crystalline zeolites, notably the y-fajusites, were particularly effective cracking catalyst components. This technology produced major strides in the amount and quality of those components of "synthetic crude" thus produced. Reasearch continues to this day to bring this basic process to the highest levels of precision.

Another major innovation took place with the introduction of the "fluidized bed" to burn coke residues which result from cracking reactions off of the catalyst particles. Synthetic catalysts are employed in fluidized beds as well as in fixed beds and in moving beds, for such varied purposes as octane improvement, sulfur removal, isomerization, etc. Various changes in the basic catalyst formulation were made in order to encourage cracking processes to take place at various conditions of temperature and pressure as well as in atmospheres of different vapors. Consideration of all of these factors has progressively resulted in the use of catalysts of vastly greater complexity. At present, complexes of alumina, aluminosilicate, silica, chromia, zirconia, gallium, germanium, etc., are generally regarded as the most effective catalysts. However, heretofore, their formulations have not fully utilized the benefits following from the use of colloidal ingredients in their binder formulations. That is to say most prior art catalyst compositions are of two general types: (1) those that are aggregates of various catalyst components which are generally held together by noncolloidal forms of known binding agents and (2) those that are formed "in situ" by growing crystalline lattices in preformed clay particles. In either case, even minor changes in known catalyst ingredients e.g., noncolloidal silica or noncolloidal alumina binding agents and/or minor changes in the ways in which the ingredients are formulated can have profound effects upon the efficacy and profitability of any given cracking operation.

Hence, new catalysts are sometimes "tailor-made" for specific duties by making subtle changes in catalyst formulations. To this end, zeolite type catalysts have proven to be particularly useful; they have been used in such varied operations as hydrocracking, alkylation, dealkylation, transalkylation, isomerization and polymerization. By way of example, U.S. Pat. No. 3,703,886 to Argauer discloses a whole class of small crystalline aluminosilicates, designated ZSM-5, which have demonstrated high selectivites in catalytic cracking processes. Low-soda exchanged Y-zeolite catalysts and ultra-stable Y-zeolite catalysts have these same desirable attributes. Use of these kinds of aluminosilicates has however presented some problems. For example, catalysts of these kinds are generally characterized by their being in the range of about 0.5 to about 4 microns in crystalline size. This characteristic renders them unsuitable for direct introduction into commercial cracking plants because of the difficulties associated with separting such small particles from vapor streams leaving reaction systems such as catalytic crackers. This is principally because well-designed cyclones are only capable of retaining or collecting particles larger than about 20 microns. Because of this limitation, there is a considerable need for binding these small crystalline catalytic materials into larger attrition-resistant aggregate particles. A second consideration in binding these aggregates is to provide particles with sufficient density to be retained in the commercial cracking unit. It is also important that the individual crystalline particles be well-dispersed in the matrix and that the matrix have sufficient pore volume to provide ready access to the crystalline catalyst particles.

These are some of the problems which are particularly addressed by this patent disclosure. In the past, the direct address of these problems has been through the use of varying proportions of different chemical species to formulate more durable catalyst matrices. These problems also have been addressed, incidentally, in the course of various chemical treatments primarily intended to implement or improve the catalytic activity of various zeolites. This has been done both by reducing catalytic reactivity when it is excessive and by increasing it when it is insufficient. Such reactivity oriented modifications are of some relevance to the attrition issue dealt with in this patent disclosure since a reduction in catalytic activity may, under certain circumstances, be accompanied by an improvement in other characteristics of the catalyst, including increased resistance to attrition and/or aging. U.S. Pat. No. 4,594,332, for example, clearly recognizes this relationship; it teaches production of hard, fracture-resistant catalysts from zeolites of the pentasil family by a process in which water, an organic additive such as hydroxyethylcellulose—which serves to increase viscosity—and a silicate are added to zeolite particles. The resultant material is then molded and calcined to produce a catalyst having increased fracture-resistance.

Thus to the extent they impart fracture-resistance to catalyst particles (assuming there are no concomitant unacceptable losses in reactivity or classification due to the sweeping action of the reaction mass through the catalyst mass), all of the above noted materials and processes represent improvements in the art of making catalysts more resistant to attrition, density changes, aging and the like. However, there still is room for further improvements and advances.

In all catalytic cracking operations in which the catalyst moves, there are two principal mechanisms by which losses occur to the bulk mass of a catalyst. It occurs first by reason of different density. Typically, classification and sequestration is caused by the action of a mass of reaction vapors sweeping through and separating catalyst particles according to their density differenes. The second loss mechanism is caused by the same forces acting upon particles of different size and/or shape to cause interparticle impacts which tend to shatter the catalyst. This in turn results in small fragments which are lost e.g., when particles less than 20 microns are not retained by a cyclone. It is therefore very important in all such processes to reduce such losses to at least economically acceptable levels.

It should also be noted that current catalytic cracking technology and practices no longer are content with employment of a "best compromise" catalyst formulation. Rather, a base mass of active catalyst is, in practice, constantly being adjusted by the addition of as many as 5 or 6 different additive concentrates. Each concentrate can have a profound influence on a specific area of catalyst activity and/or performance e.g., completion of coke oxidation during regeneration, limitation of hydrogen production, promotion of olefin formation, promotion of isomerization, etc. However, for such introductions of concentrates to be effective and feasible, that is to say, not requiring vast amounts of equipment, labor and constat addition and removal of catalysts, sampling, testing and readjustment of the bulk composition, several salient features and circumstances must be in operation. First, the active specific ingredient of the additive must be highly concentrated in the additive material. Second, it must be added rapidly and evenly. It is these presisting requirements and circumstances which continue to create a need for materials, such as those described in this patent disclosure, which are capable of being quickly introduced into a catalytic system without experiencing unacceptable attrition losses.

SUMMARY OF THE INVENTION

Applicants have found a method for introducing high concentrations of small crystalline, but otherwise desirable, catalyst ingredients such as ZSM-5, low-soda exchanged Y-zeolite, ultra-stable Y-zeolites etc., into catalytic cracking units. For the purposes of this patent disclosure the term "small crystalline catalyst ingredient" means those catalytic ingredients 4 microns and smaller in particle diameter. High concentrations of these ingredients can be formed into microspheres, and preferably formed into microspheres having an average diameter of 60-80 microns with a minimum amount of material below about 20 microns. In other words, Applicants have found a method for introducing high concentrations of small crystalline catalyst ingredients such as those noted above into overall resultant binder matrices which are "hard" i.e., able to resist attrition and/or density changes. Our improvements were accomplished by concentrating on the physical nature, and chemical processing, of the binder formulation employed to hold together those primary reactive ingredient(s) which constitute a portion of a final catalyst product.

It should be specifically noted however that the composite catalysts disclosed herein have utilities which are independent of their own catalytic activities. For example, they can be introduced into a fluid catalytic cracking unit which is using major amounts of other totally different catalysts in order to "adjust" or otherwise modify that catalytic activity. Thus they can be used to quickly introduce small crystalline catalysts such as ZSM-5, low-soda exchanged Y-zeolite, ultra-stable Y-zeolite etc., into a catalytic system whose bulk catalyst is not necessarily any of these catalysts. In any event, whether the herein disclosed catalysts are used as materials to adjust the operation of a cracking catalyst unit, or as catalysts in their own right, an initial understanding of this invention begins with the realization that catalysts generally are complex blends of small particle-size ingredients and that these ingredients are normally directly mixed with a binding agent, dried and calcined. Again, the function of the binding agent is to hold the finished catalyst particle together without appreciably interfering with its catalytic activity. The resultant particles also must conform to a relatively narrow range of particle sizes and density which are often tailored to the particular process in which they are employed.

It is a most important accomplishment of our particlar binders to be able to produce catalyst particles which contain high concentrations of desirable, small crystalline, catalyst additive ingredients by imparting to them durability without loss of specific activity. That is to say, this invention also is particularly concerned with reducing the attrition of, and preserving the density of zeolites such as ZSM-5, low-soda exchanged Y-zeolite and ultrastable Y-zeolite, as well as other small crystalline catalytic materials such as, for example, those disclosed in U.S. Pat. No. 3,941,871.

The attrition-resistant catalysts taught by this patent disclosure are made from two general types of ingredients: (1) binder formulations and (2) main ingredient formulations. The binder formulations are in turn made of: (1) colloidal silica, or (2) colloidal alumina, or (3) colloidal silica and acid dispersed alumina (which may be noncolloidal, acid dispersed alumina as well as colloidal, acid dispersed alumina), or (4) colloidal silica and colloidal zirconia, or (5) mixtures of the ingredients just listed as ingredients (1) through (4). Thus our binder formulations must have at least one colloidal ingredient. It is also preferable that the colloidal ingredients be amorphous as well. That is to say amorphous forms of colloidal sized ingredients are preferred. We have found that the use of noncolloidal (or noncolloidal and nonamorphous) ingredients of the same species, processed in the very same manner, will produce matrices of decidedly inferior quality with respect to attrition resistance and/or density change. The binder formulation portions of our overall formulations may also have other, optional, ingredients such as, for example, other catalytic ingredients, inert ingredients, kaolin clay and/or barite.

That is to say, the main ingredient formulation portions of our overall formulations will comprise at least one small crystalline catalytically active ingredient. The remainder of the main ingredient formulation may be comprised of one or more other catalytically active ingredients (which may or may not be of the small crystalline type) and/or one or more inert ingredients and/or mixtures of all of the above catalytically active and inert ingredients. Again, kaolin clay is a particularly preferred ingredient. The small crystalline catalytically active ingredient most preferably will be of the ZSM-5, low-soda exchanged Y-zeolite or ultra-stable Y-zeolite varieties. The remaining other catalytically active ingredients can vary considerably but, as in the case of the binder formulation portions of our overall formulations, kaolin clay and barite are particularly preferred ingredients. The inert ingredients, if any are employed, may be any of the class of inert materials well known to the catalyst formulation art.

Regardless of the exact identity and relative proportions of the binder formulations and the main ingredient formulations, these two sets of ingredients are then slurried in sufficient water to form a uniform, pumpable and sprayable slurry. One preferred formulation method is to mix the alumina into a silica/active ingredient slurry. In any event, the resulting slrury is then spray-dried and calcined by techniques well known to this art.

The relative proportions of ingredients specified in this patent disclosure, unless otherwise specified, are expressed as percentages by weight of the total weight of the "solid" ingredients in the resulting attrition-resistant matrices. That is to say the percentages expressed do not take into account the weight of the water used to make up the slurries in which the solid ingredients are placed or the weight of any of the acids (mineral or organic acids may be employed) which can be employed as dispersing agents in making up certain versions of our binder formulations.

In any case the binder formulation ingredient portions of the overall formulations will comprise from about 3 to about 30 weight percent of our resultant attrition-resistant matrices. Hence the main ingredient formulation (e.g. ZSM-5, low-soda exchanged Y-zeolite or ultra-stable Y-zeolite, plus some other catalytically active ingredient) will comprise from about 97 to about 70 weight percent of the resultant matrices. When ZSM-5 is employed as the small crystalline catalyst in the main ingredient formulation it will preferably represent from about 5 to about 60% by weight of the resultant matrix. Generally speaking the higher percentages are preferred. The remaining catalytically active and/or inert ingredients will comprise from about 10 to about 50 and more preferably from about 10 to about 20 weight percent of the resulting matrix. When colloidal silica and colloidal alumina, or colloidal silica and acid dispersed alumina, are used in conjunction, the silica to alumina ratio (again by weight) will preferably be from about 5:1 to about 1:1. When colloidal zirconia is employed it will preferably represent from about 1 to about 15 weight percent of the resulting matrix. In the most preferred versions of our methods and materials, colloidal zirconia will only be used in conjunction with colloidal silica and not in conjunction with colloidal alumina or acid dispersed alumina. A particularly preferred form of colloidal zirconia is colloidal zirconia silicate.

The improved attrition-resistant qualities of our matrix binders derive from the resulting matrix structures produced by our ingredients and processes. Unfortunately, the hardening mechanisms whereby these structures are created are not fully understood. However, one particular feature of our binder ingredient seems to consistently contribute to the "success" i.e., the hardness and density of our resulting matrices; that feature is use of the amorphous and/or colloidal form of the primary ingredients in the binder formulation employed to hold the main catalytic ingredients together. These amorphous materials run in a range from readily mixable colloids to the consistency of a thixotropic gel which requires preliminary dispersion, preferably through the use of a dispersing agent such as a mineral or organic acid (e.g., formic acid), and preferably under high shear before, or during, admixture with the remainder of the binder ingredients. The presence of amorphous and/or colloidal ingredients of this kind, especially in the presence of kaolin clay, serves to give form and body to our slurry particles during the spray drying; and by hypothesis, serves to form a particularly effective framework for the crystalline lattice during calcining. It is conjectured that during calcining, only the colloidal or colloidal and amorphous forms of the disclosed materials are capable of being fluxed by the action of mixed metal oxides, and forming solid solutions and hydrates at eutectic proportions, and thereby giving rise to our new crystalline structures at the relatively low temperatures, e.g., 1,000 degrees Fahrenheit, encountered during calcining operations.

Some of the most preferred matrices taught by this patent disclosure will be made from: (1) a relatively small portion of the binder formulation (e.g., 3 to 10%), which may itself have catalytically active ingredients such as alumina and silica, (2) a relatively large portion of kaolin clay (e.g., 20 to 27%) which serves as a filler and to give form and substance to the resulting matrix, (3) a densifying agent such as barite to increase the particle density of the finished catalyst if this is necessary to meet commercial criteria for this variable, (4) a relatively large portion of a main catalytically active ingredients which will preferably be ZSM-5, low-soda exchanged Y-zeolite, ultra-stable Y-zeolite, etc., and (5) other catalytically active or inert ingredients.

A most important aspect of this invention is the fact that use of the disclosed binder formulations in the manner described enables the successful introduction of up to 60 weight percent of a small crystalline catalyst such as ZSM-5 into the overall resulting matrix. In certain preferred embodiments of our invention, there is at least one other main catalytically active ingredient besides the preferred ZSM-5 ingredient. Preferably this other catalytically active ingredient will be selected from the group consisting of low-soda exchanged Y-zeolite and ultra-stable Y-zeolite. These other ingredients need not however be colloidal inform. There are also some especially preferred ingredient species in our binder formulations: they are low sodium, or sodium free, colloidal silica and acid dispersible alumina of the pseudoboehmite type (e.g. Catapal A). It should also be noted that variations in the relative proportions of the colloidal silica and/or colloidal alumina and/or colloidal zirconia within the disclosed ranges also can serve to permit adjustment of the additive matrix acidity and/or binding characteristics. Other preferred ingredients in our matrices are kaolin clay and barite. That is to say that the colloidal alumina and/or colloidal zirconia also can act as primary controllers of the overall cracking activity. However, their proportions should be varied on the gross scale rather than on the specific action of the concentrated catalyst additives described in this patent application. It is for this reason that the preparation and formulation of additive matrices are preferably presented over a range of proportions of silica to alumina which are preferably in the range of about 5:1 to about 1:1 by weight.

In other preferred embodiments of this invention, the ingredients e.g., binder, kaolin, barites (if required), small crystalline active catalysts etc. are mixed with sufficient water to form a slurry. The active catalyst ingredients may be mixed with the binder formulation prior to slurrying or they may be incorporated during the slurrying operation. In either case the ingredients are mixed with sufficient water to make a uniform, sprayable, slurry which is then spray-dried in conventional equipment. The resulting product is then calcined from about 30 minutes to about 100 minutes in the temperature range of from about 800 to about 1,500 degrees Fahrenheit. The calcining typically will be carried out at about 1,000 degrees Fahrenheit for about one hour. The resulting particles are most preferably calcined to form microspheroidal Fluid Catalytic Cracking Catalyst (FCC-MS) particles in the controlled size range of from about 20 to about 80 microns, average diameter. Again, FCC-MS particles in the 60–80 microns range, with a minimum amount of particles less than about 20 microns, are highly preferred particle sizes.

In another particularly preferred formulation method, colloidal silica is mixed with a catalyst ingredient mixture, wherein at least one ingredient of said mixture is a small crystalline catalytic material mixed with sufficient water to form a first slurry. This first slurry is mixed with an acid dispersed alumina (and/or colloidal alumina9 to form a second slurry. The second slurry is then mixed with sufficient water to form a resultant, uniform, sprayable formulation which is then spray-dried and calcined.

Thus this patent disclosure particularly contemplates, but should not be limited to, methods for forming attrition-resistant matrices having up to about 60 weight percent of small crystalline catalytic ingredients. The most preferred methods generally comprise: (1) combining a colloidal silica with an acid dispersed alumina to an overall silica to alumina ratio from about 5:1 to 1:1 (or in the alternative replacing the acid displaced alumina with a colloidal alumina); (2) mixing the resulting colloidal silica/alumina (acid dispersed and/or colloidal) mixture with kaolin clay and/or barites with sufficient water to form a uniform slurry; (3) mixing the slurry with at least one small crystalline catalyst material, wherein the mixing is done in proportions such that the silica and alumina in the slurry constitutes from about 3 to about 30 weight percent, and the small crystalline catalyst material constitues from about 5% to about 60 weight percent of a sprayable formulation capable of producing a attrition-resistant matrix; (4) spray-drying the formulation to form microspheroidal catalyst particles; and (5) calcining the microspheriodal catalyst particles to produce an attriton-resistant catalyst product. Again, the resulting products can be used as catalysts in their own right or they may be used to adjust reactions catalyzed by other catalysts.

This patent disclosure also contemplates: a method for forming an attrition-resistant matrix having up to about 60 weight percent of a small crystalline catalytic ingredient, said method comprising: (1) mixing a colloidal silica with a catalyst ingredient mixture, wherein at least one ingredient of said mixture is a small crystalline catalyst material, with sufficient water to form a first slurry; (2) mixing the first slurry with an acid dispersed alumina to an overall colloidal silica to dispersed alumina ratio of from about 5:1 to about 1:1 by weight to form a second slurry; (3) mixing the second slurry with sufficient water to form a resultant, uniform, sprayable formulation; (4) spray-drying the sprayable formulation to form microspheroidal matrix binder particles; and (5) calcining the matrix binder particles to produce attrition-resistant matrix particles. A method for forming an attrition-resistant matrix having up to about 60 weight percent of a small crystalline catalytic ingredient, said method comprising: (1) mixing colloidal silica with a catalyst ingredient mixture, wherein at least one ingredient of said mixture is a small crystalline catalyst material, with sufficient water to form a first slurry; (2) mixing the first slurry with colloidal alumina to an overall colloidal silica to dispersed alumina ratio of from about 5:1 to about 1:1 by weight to form a second slurry; (3) mixing the second slurry with sufficient water to form a resultant, uniform, sprayable formulation; (4) spray-drying the sprayable formulation to form microspheroidal matrix binder particles; and (5) calcining the matrix binder particles to produce attrition-resistant matrix particles.

Similarly, this patent disclosure also particularly contemplates resulting attrition-resistant catalyst matrices, as products (of processes for making those products) that contain ZSM-5 as the small crystalline catalyst material; a colloidal silica which is a low sodium, colloidal silica selected from the group consisting of NYACOL 9950, NYACOL 2050, NYACOL 2034 DI, NYACOL 2040 $NH^4$, and NYACOL 830; an acid dispersed alumina which is of the pseudoboehmite type; an acid dispersed alumina which is dispersed blending in the presence of formic acid; a colloidal alumina, which is NYACOL A1/20; between about 1 and about 15 weight percent colloidal zirconia added to the colloidal silica; and remaining matrix materials which are selected from the group consisting of barite and kaolin clays. As in the case of the process aspects of this patent disclosure, the spray-drying used to create such attrition-resistant matrices product should also be carried out to form microspheroidal catalyst particles of from about 20 to about 80 microns, average diameter (most preferably these products will be in the 60–80 micron range with minimum amounts below 20 microns); and the calcining should be carried out between about 30 and about 100 minutes, between about 800 and 1,500 degrees Fahrenheit (and preferably at about 1,000 degrees F. for about 1 hour).

This patent disclosure also particularly contemplates: a method for forming an attrition-resistant matrix having up to about 60 weight percent of a small crystalline catalytic ingredient, said method comprising: (1) mixing a colloidal silica with a catalyst ingredient mixture, wherein at least one ingredient of said mixture is a small crystalline catalyst material, with sufficient water to form a first slurry; (2) mixing the first slurry with an acid colloidal zirconia to an overall colloidal silica to colloidal zirconia ratio of from about 5:1 to about 1:1 be weight to form a second slurry; (3) mixing the second slurry with sufficient water to form a resultant, uniform, sprayable formulation; (4) spray-drying the sprayable slurry formulation to form microspheroidal matrix binder particles; and (5) calcining the matrix binder particles to produce attrition-resistant matrix particles.

Also contemplated is an attrition-resistant matrix having up to about 60 weight percent ZSM-5 produced by: (1) mixing a colloidal silica with a catalyst ingredient mixture, wherein at least one ingredient of said mixture is a small crystalline catalyst material, with sufficient water to form a first slurry; (2) mixing the first slurry with an acid dispersed alumina to an overall colloidal silica to acid dispersed alumina ratio of from about 5:1 to about 1:1 by weight to form a second slurry; (3) mixing the second slurry with sufficient water to form a resultant, uniform, sprayable formulation; (4) spray-drying the sprayable formulation to form microspheroidal matrix binder particles; and (5) calcining the matrix binder particles to produce an attrition-resistant matrix particles.

Also included within the scope of this patent are the matrices themselves. These would include (1) attrition-resistant catalyst matrix products which are primary catalysts in their own right i.e., matrices which are not used to "adjust" the reactions of other catalysts, but rather are specifically used to catalyze particular catalytic reactions such as those typically carried out in a fluidized bed.

The preferred raw materials for carrying out the teachings of this invention can come from various sources such as those listed in the INGREDIENTS LISTING portion of this patent disclosure. It should be noted however that the named suppliers often call upon specific natural resource sites; and that in many cases these sources are distinctly characterized, but otherwise known only by the name of the supplier, hence, Applicants have in many instances used not only a brand name but a grade name and a physical form to specify certain materials. In any event the main point still is that any raw materials designated as colloidal ingredients should be less than 4 microns average diameter and most preferably should also be amorphous in character. It is also worthwhile to mention in passing the need for special treatment in handling and dispersing the alumina ingredient known as Catapal alumina because it is often important to the success of certain specific formulations; most preferably it should be dispersed with formic acid.

DESCRIPTION OF THE PREFERRED EMBODIMENTS

Figure 1:
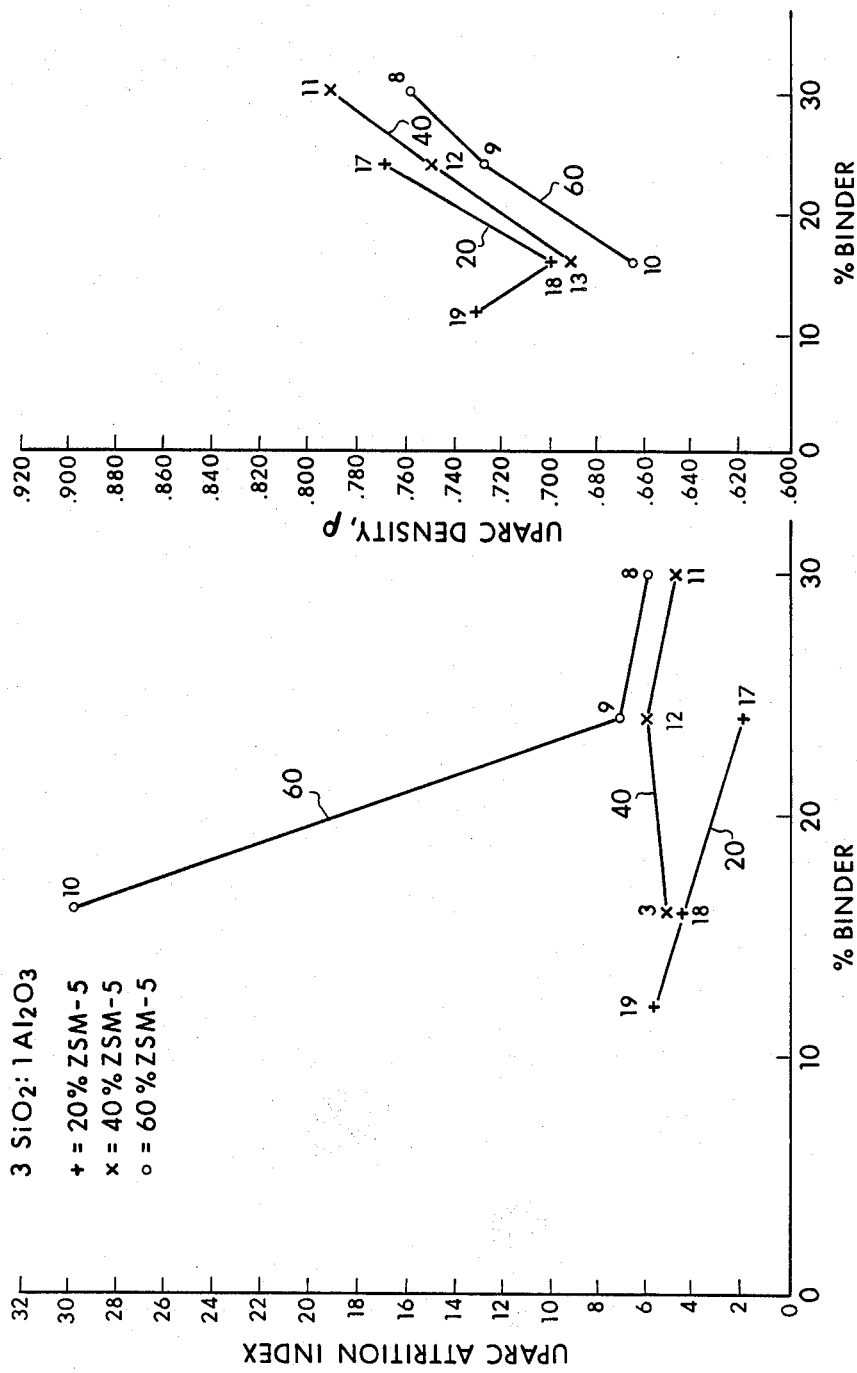
FIG. 1 graphs standard attrition and standard density on two ordinates, versus weight percent binder as abscissae for a representative matrix material which includes 20% ZSM-5 and 3 parts $SiO_2$ to 1 part $Al_2O_3$.

It will serve to clarify this patent disclosure to select and discuss three representative experimental runs, results, graphical representations and corresponding formulations. They purposely include one taken from a group which was designed to meet the most severe trials, namely those at a 60% ZSM-5 level, in order to particularly demonstrate the effectiveness of our catalyst materials. Moreover, it should first be noted that the graphs and tables accompanying this patent disclosure are all arranged according to the same pattern in order to provide a basis of comparison with respect to the selected set of criteria in order to demonstrate the success of our binders in forming attrition-resistant matrices of near constant density.

Each of the three individual graphs present two prime experimental results of a standard attrition test and a standard density test as two ordinates, with weight percent binder being the abscissae in both cases. It should, however, also be noted that these empirical tests are subject to minor departures and errors caused by test conditions, mixing/sampling variations, handling, etc.; they also may be due to true differences in results, caused by disregarded variables deemed to be inconsequential with respect to the gross behavioral response under observation. Each graph shown is representative of a whole series of graphs which, in the interests of brevity and clarity, have not been shown.

The graphs presented are especially informative if they are considered in the paired presentation of each of these figures. For example, in each pair of graphs two fundamentally important independent variables are taken into consideration by plotting one variable as a parameter while holding the other constant for the pair of graphs as a whole. Thus for example, one form of paired graph may represent one parameter held constant over a weight ratio of silica to alumina in a binder formulation for a set of data in which weight percent ZSM-5 was held constant; another form may present parameters of constant weight percent ZSM-5 in a catalyst mass for a set of data having a constant silica-alumina ratio.

It should also be appreciated that the absolute values of the numerical results of these tests are of secondary importance. It is more important to note that these tests indicate that (given a matrix formulation having little or no ZSM-5 type ingredients, and hence most probably having acceptable attrition resistant qualities), in order to overcome the otherwise undesirable effects of greatly increased small particle ingredient proportions in a formulation, it is necessary to add compensating amounts of the herein disclosed binder formulations. That is to say it is more important to note that these tests tell what amounts of our binder formulations will restore an attrition-resistance performance of a high concentration small crystalline catalyst such as ZSM-5 to the level of attrition-resistance shown by a catalyst having a low concentration of the small crystalline catalyst. In any event, the results of these attrition tests demonstrate that with the addition of from about 4 to about 30 weight percent of our binder formulations, the attrition index of the resulting matrix is reduced to, and stabilized at, a level typical of catalysts having low (e.g. less than 10%) ZSM-5 proportions and that their particle densities also stay within the ranges which are also typical of low ZSM-5 catalyst.

These graphs also show the following other general results: (1) increasing the amount of binder invariably reduces the attrition index and, with a few exceptions, increases the particle density; (2) increasing the proportion of alumina always results in a catalyst requiring, in general, more binder to reach stability; and (3) an increase in the binder proportion will increase the catalyst density, but an increase in ZSM-5 lowers the density and the overall result is a catalyst of lower density.

Figure 2:
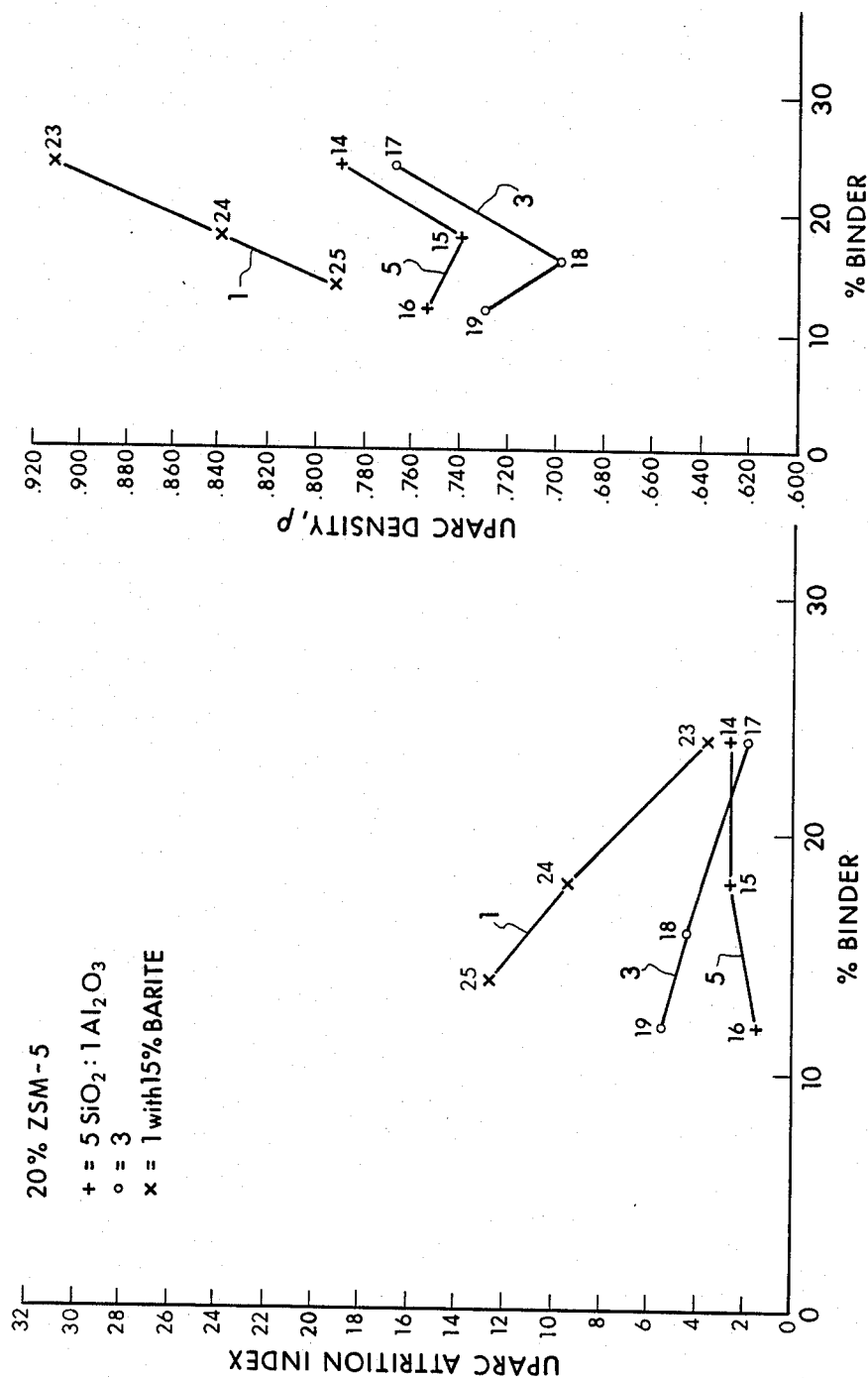
FIG. 2 also graphs standard attrition and standard density on two ordinates, versus weight percent binder as abscissae, for a representative matrix material which includes 20% ZSM-5 and 5 parts $SiO_2$ to 1 part $Al_2O_3$.
Figure 3:
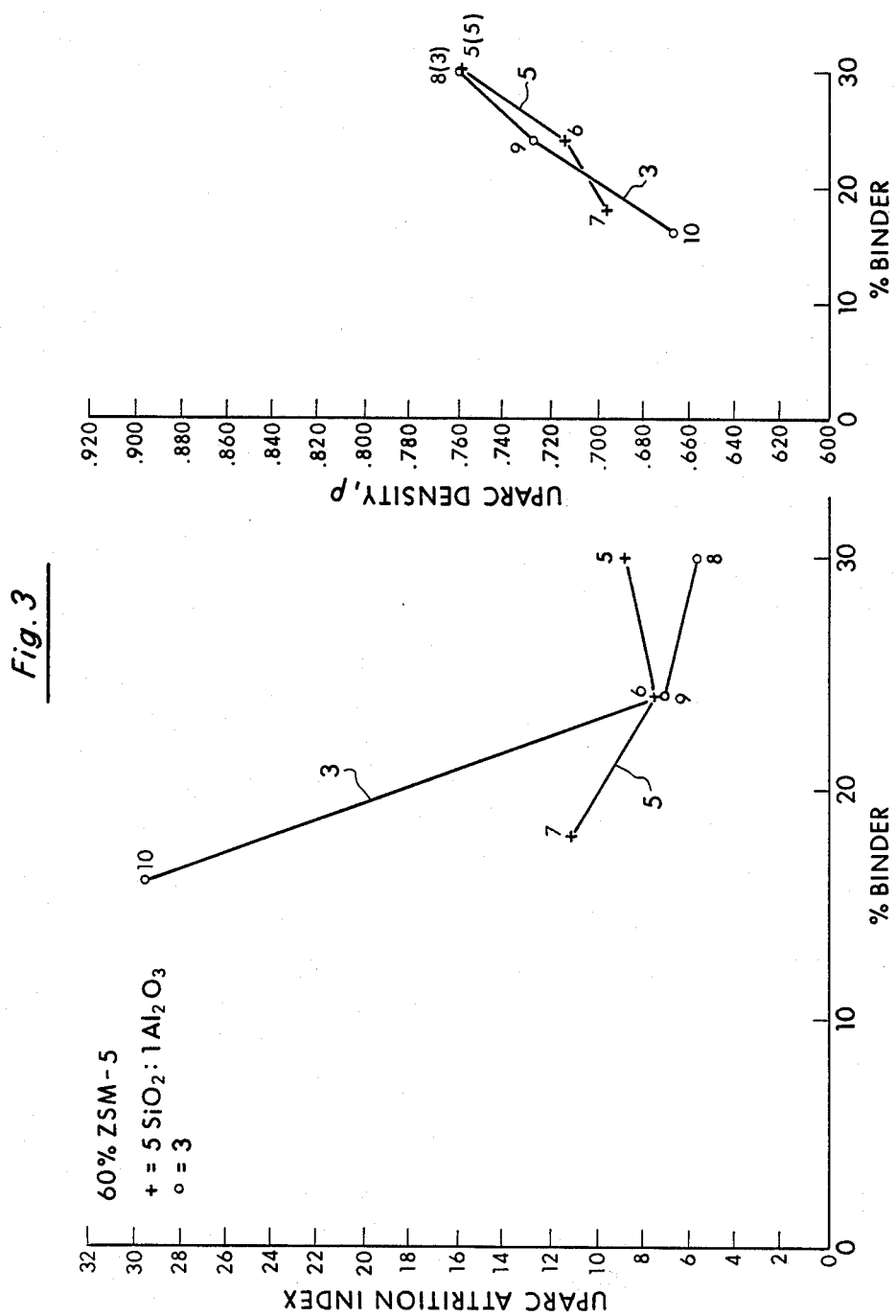
FIG. 3 depicts graphs standard attrition and standard density, versus weight percent binder as abscissae for a representative matrix material which includes 60% ZSM-5 and 5 parts $SiO_2$ to 1 part $Al_2O_3$.

Again, the three graph pairs shown in FIGS. 1, 2 and 3 were selected from a large body of graphs and supporting data because they were deemed the most capable of demonstrating the preferred embodiments of this invention. FIG. 1 graphs the results for an average silica-alumina ratio of 3:1 taking: (1) formulations 17, 18, and 19 (see Example I of the PREFERRED EMBODIMENTS section of this patent application) to depict the effects of increasing binder on 20% ZSM-5 mixtures, (2) formulations 11, 12 and 13 (again see Example I) to depict the effect on 40% ZSM-5, and (3) formulations 8, 9 and 10 to show the effect on 60% ZSM-5. The results show reduction of a runaway attrition index at 60% ZSM-5 with 16% binder to an index of 6 with 30% binder, equal to that of only 20% ZSM-5 with 12% binder. Particle density rose to 0.79, not significantly higher than the 0.73 value obtained at the low ZSM-5 mixture. FIG. 2 presents results for a relatively low ZSM-5 concentration taking results of: (1) formulations 14, 15 and 16 to depict the effects of binder percent on 5:1 silica-alumina mixtures, (2) formulations 17, 18 and 19 to show the effect of binder on 3:1 silica-alumina mixtures, and (3) formulations 23, 24 and 25 to show the binder effect on 1:1 silica-alumina, mixtures. Here, with low ZSM-5 concentrations, attrition stability is achieved with 24% binder on the material, comparable to the attrition index achieved with 12% binder on the high silica material.

It also is of interest to note the effect of varying the ZSM-5 concentration around a center set of values: 3:1 silica-alumina, then varying the silica-alumina ratio about a center value of 20% ZSM-5. An anomaly of particle density at low ZSM-5 is brought out and, in the high silica sample, compensation by the common addition of barite is demonstrated. Finally, FIG. 3 presents, as a development of the first two figures, the results most sought after: a durable matrix having up to 60 weight percent ZSM-5. Again by taking (1) formulations 8, 9, and 10 as a reference departure for 3:1 silica-alumina, and (2) formulations 5, 6, and 7 to demonstrate reduction of the attrition index at 30% binder and in keeping with values for the harder 5:1 silica-alumina ratio at 18% binder, the attrition resistance qualities of the high proportion ZSM-5 matrices are demonstrated. Note also that particle density only rose from 0.696 to 0.760.

Thus a grid survey has been completed mapping onto the restriction surfaces of hardness and density, the operative variables of weight percent ZSM-5 and silica-alumina ratio. They show the absolute capability of the binder weight percent to force the operative variables to conform to the restrictions.

Various formulations were tried to eliminate variations in the quality of the essential ingredients by substituting various other colloidal silicas and aluminas. Careful note was also made of the effectiveness of the ability of colloidal zirconia to trigger the action of the silica blend. Similarly, the effects of other catalyst ingredients such as barite and/or kaolin clays on the density and attrition characteristics of our formulations were studied. In all cases, a binder level of up to 30% by weight was sufficient to reduce mechanical attrition and density change in catalysts samples containing up to 60% by weight ZSM-5. The results of these test runs are shown by the following tabulations of the total formulations as well as by the previously discussed graphs.

EXPERIMENTAL METHODS AND RESULTS

The attrition data collected from trials of these kinds demonstrated the excellent binding characteristics of our colloidal silica/dispersed alumina series at all ZSM-5 input levels up to 60%. Inputs of greater than 60% were not attempted at this time. Generally speaking, the objects of this particular test series were to:

1. Determine preferred silica to alumina binder ratios. The weight ratios chosen were 5 silica to 1 alumina, 3 silica to 1 alumina, and 1 silica to 1 alumina.
2. Determine the minimum binder requirements for each ratio at 20%, 40%, and 60% ZSM-5 input.
3. Determine the binder ratio and binder level effect on density.
4. Determine the effect of barite on the density and attrition characteristics of 1:1 ratio binder at 20% and 40% ZSM-5 inputs.
5. Determine the binding ability of alternate colloidal silica types compared to that tested in disclosed experiments.
6. Determine the effectiveness of colloidal zirconia as a trigger for 9950/2050/830 colloidal silica systems.

RAW MATERIALS

The raw materials employed were generally those listed in the ensuing INGREDIENT LISTING portion of this patent disclosure.

FEED PREPARATION

The feed preparation was essentially as reported in previous portions of this patent disclosure

SPRAY DRYER

The spray dryer pump discharge pressures were typically 10–15 PSIG with dead-head pressures in excess of 40 PSIG. Slurries that could be forced into the pump suction could be pumped into the dryer.

SAMPLE ANALYSIS AND DATA TREATMENT

The spray dryer discharge samples could be calcined at 800–1,500 F. for from about 30 to about 100 minutes. However most of our tests were conducted at 1000° F. for about one hour. Samples of each spray dryer run were sent to a commercial analytical lab for analysis prior to sending them to another facility for attrition and density testing. Again, the catalyst formulations plot the attrition and density data as a function of binder level and binder silica/alumina ratios.

| INGREDIENT LISTING | | |
|---|---|---|
| MATERIAL | SUPPLIER | GRADE |
| Colloidal Silica | NYACOL | 2034DI |
| Colloidal Silica | NYACOL | 2040NH$_3$ |
| Colloidal Silica | NYACOL | 9950 |
| Colloidal Silica | NYACOL | 2050 |
| Colloidal Silica | NYACOL | 830 |
| Colloidal Zirconia | NYACOL | Zirconia 10/20 |
| Colloidal Alumina | NYACOL | Al/20 |
| ZSM-5 Zeolite | MOBIL | ZSM-5 |
| Dispersible Alumina | CONDEA | Pural, Dispersal |
| Dispersible Alumina | VISTA | Catapal A, B and D |
| Amorphous Alumina | ALCOA | CP-5 |
| Kaolin Clay | HUBER | 95 |
| Kaolin Clay | HUBER | HG-90 |
| Kaolin Clay | ECC | AA2403 |
| Barite | BAROID | LC 98 |
| Formic Acid | Fisher Scientific | 90% HCOOH |

| | | |
|---|---|---|
| Ammonium Hydroxide | UPARC | 28% NH₄OH |
| Soda Y Zeolite | PQ | 30 0-63 |
| US Y Zeolite | PQ | USY |

FORMULATIONS AND ANALYTICAL DATA
EXAMPLE I

| Sample ID | ICB-1 | ICB-2 | ICB-3 | ICB-4 | ICB-5 | ICB-6 | ICB-7 | ICB-8 | ICB-9 | ICB-10 | ICB-11 | ICB-12 | ICB-13 |
|---|---|---|---|---|---|---|---|---|---|---|---|---|---|
| Formulations | | | | | | | | | | | | | |
| ZSM-5 | 41.6 | 41.2 | 40.9 | 41.6 | 60 | 60 | 6 | 60 | 60 | 60 | 40 | 40 | 40 |
| 2034DI | 22.1 | 17.5 | 13 | 22.1 | 25 | 20 | 15 | 22.5 | 18 | 12 | 22.5 | 18 | 12 |
| Binder alumina | 5.2 | 4.1 | 3.1 | 5.2 | 5 | 4 | 3 | 7.5 | 6 | 4 | 7.5 | 6 | 4 |
| Clay | 31.2 | 37.1 | 43 | 31.2 | 10 | 16 | 22 | 10 | 16 | 24 | 30 | 36 | 44 |
| Barite | — | — | — | — | — | — | — | — | — | — | — | — | — |
| Ratio | 4.25 | 4.27 | 4.19 | 4.25 | 5 | 5 | 5 | 3 | 3 | 3 | 3 | 3 | 3 |
| % Binder | 27.3 | 21.6 | 16.1 | 27.3 | 30 | 24 | 18 | 30 | 24 | 16 | 30 | 24 | 16 |
| Solids | 37 | 40 | 40 | 37 | 32 | 34.5 | 37 | 29.5 | 32 | 36 | 32 | 35 | 40.5 |
| Input Weights | | | | | | | | | | | | | |
| ZSM-5 | 1042 | 1042 | 1042 | 1042 | 1571 | 1571 | 1571 | 1571 | 1571 | 1571 | 1047 | 1047 | 1047 |
| 2034DI | 625 | 500 | 375 | 625 | 735 | 588 | 441 | 662 | 530 | 353 | 662 | 530 | 353 |
| Binder alumina | 67 | 53 | 40 | 67 | 67 | 53 | 40 | 100 | 80 | 53 | 100 | 80 | 53 |
| Clay | 353 | 424 | 494 | 353 | 118 | 188 | 259 | 118 | 188 | 282 | 353 | 424 | 518 |
| Barite | — | — | — | — | — | — | — | — | — | — | — | — | — |
| H₂O | 608 | 487 | 365 | 608 | 608 | 487 | 365 | 913 | 730 | 487 | 913 | 730 | 487 |
| Formic | 17 | 13 | 10 | 17 | 17 | 13 | 10 | 25 | 20 | 13 | 25 | 20 | 13 |
| Analytical Data | | | | | | | | | | | | | |
| AI | | 3.51 | 9.57 | 4.57 | 8.8 | 7.45 | 11.1 | 5.8 | 7.1 | 29.5 | 4.48 | 5.99 | 5.0 | 2 |
| Density | | .743 | .707 | .764 | .758 | .716 | .696 | .759 | .728 | .667 | .791 | .750 | .694 | .792 |

| Sample ID | ICB-15 | ICB-16 | ICB-17 | ICB-18 | ICB-19 | ICB-20 | ICB-21 | ICB-22 | ICB-23 | ICB-24 | ICB-25 | ICB-26 |
|---|---|---|---|---|---|---|---|---|---|---|---|---|
| Formulations | | | | | | | | | | | | |
| ZSM-5 | 20 | 20 | 20 | 20 | 20 | 40 | 40 | 40 | 20 | 20 | 20 | 5* |
| 2034DI | 15 | 10 | 18 | 12 | 9 | 12 | 10 | 8 | 12 | 9 | 7 | — |
| Binder alumina | 3 | 2 | 6 | 4 | 3 | 12 | 10 | 8 | 12 | 9 | 7 | 25 |
| Clay | 62 | 68 | 56 | 64 | 68 | 21 | 25 | 29 | 41 | 47 | 51 | 70 |
| Barite | — | — | — | — | — | 15 | 15 | 15 | 15 | 15 | 15 | — |
| Ratio | 5 | 5 | 3 | 3 | 3 | 1 | 1 | 1 | 1 | 1 | 1 | — |
| % Binder | 18 | 12 | 24 | 16 | 12 | 24 | 20 | 16 | 24 | 18 | 14 | 25 |
| Solids | 44 | 43.5 | 39 | 40 | 40 | 24.6 | 31 | 33 | 32 | 35 | 39 | 20 |
| Input Weights | | | | | | | | | | | | |
| ZSM-5 | 524 | 524 | 524 | 524 | 524 | 1047 | 1047 | 1047 | 524 | 524 | 525 | 56 |
| 2034DI | | 441 | 294 | 530 | 353 | 265 | 353 | 294 | 235 | 353 | 265 | 212 | — |
| Binder alumina | 40 | 27 | 80 | 53 | 40 | 160 | 133 | 107 | 160 | 120 | 93 | 333 |
| Clay | 730 | 800 | 659 | 753 | 800 | 247 | 294 | 354 | 482 | 553 | 600 | 824 |
| Barite | — | — | — | — | — | 250 | 250 | 250 | 251 | 250 | 251 | — |
| H₂O | 536 | 645 | 730 | 804 | 861 | 1962 | 1217 | 971 | 1462 | 1095 | 852 | 2695 |
| Formic | 10 | 7 | 20 | 13 | 10 | 40 | 33 | 27 | 40 | 30 | 23 | 83 |
| Analytical Data | | | | | | | | | | | | |
| AI | 2.72 | 1.63 | 2.01 | 4.5 | 5.49 | 4.25 | 7.14 | 9.35 | 3.74 | 9.46 | 12.7 | 5.92 |
| Density | .742 | .757 | .769 | .700 | .732 | .866 | .833 | .796 | .913 | .842 | .794 | .865 |

*PQ zeolite

| Sample ID | ICB-27 | ICB-28 | ICB-29 | ICB-30 | ICB-31 | ICB-32 | ICB-33 | ICB-34 | ICB-35 | ICB-36 | ICB-37 | ICB-38 |
|---|---|---|---|---|---|---|---|---|---|---|---|---|
| Formulations | | | | | | | | | | | | |
| ZSM-5 | 25* | 20 | 20 | 40 | 20 | 20 | 20 | 40 | 40 | 20 | 20 | 40 |
| 2040 NH₄ | 5** | — | — | — | — | 15 | 10 | 20 | 15 | 12 | 9 | 18 |
| 9950 | — | 8 | 8 | 9 | 5 | — | — | — | — | — | — | — |
| 830 | — | 6 | 6 | 8 | 5 | — | — | — | — | — | — | — |
| 2050 | — | 6 | 6 | 8 | 5 | — | — | — | — | — | — | — |
| Binder alumina | 20 | — | — | — | — | 3 | 2 | 4 | 3 | 4 | 3 | 6 |
| Zircon | — | 5 | 2 | 2 | 1.6 | — | — | — | — | — | — | — |
| Clay | 50 | 45 | 48 | 23 | 53 | 62 | 68 | 36 | 42 | 64 | 68 | 36 |
| CP-5 | — | 10 | 10 | 10 | 10 | — | — | — | — | — | — | — |
| % Binder | 25 | 25 | 22 | 27 | 17 | 18 | 12 | 24 | 18 | 16 | 12 | 24 |
| Solids | 24.5 | 28 | 27 | 28 | 29.6 | 42 | 40 | 35 | 34 | 37 | 38 | 35 |
| Input Weights | | | | | | | | | | | | |
| ZSM-5 | 278 | 483 | 483 | 962 | 482 | 481 | 481 | 962 | 962 | 481 | 481 | 962 |
| 2040 NH₄ | 147* | — | — | — | — | 375 | 251 | 500 | 375 | 300 | 225 | 450 |
| 9950 | — | 160 | 160 | 180 | 100 | — | — | — | — | — | — | — |
| 830 | — | 200 | 200 | 267 | 167 | — | — | — | — | — | — | — |
| 2050 | — | 120 | 120 | 160 | 100 | — | — | — | — | — | — | — |
| Binder alumina | 267 | — | — | — | — | 40 | 27 | 53 | 40 | 53 | 40 | 82 |
| Zircon | — | 208 | 50 | 84 | 69 | — | — | — | — | — | — | — |
| Clay | 588 | 529 | 565 | 282 | 625 | 729 | 800 | 424 | 494 | 753 | 800 | 424 |
| CP-5 | — | 133 | 133 | 133 | 133 | — | — | — | — | — | — | — |
| Formic | 67 | — | — | — | — | 10 | 7 | 13 | 10 | 13 | 10 | 20 |
| H₂O | 2740 | 750? | 2000 | 1500 | 1700 | 745 | 1193 | 887 | 1065 | 1087 | 1065 | 930 |

-continued

| Analytical Data | | | | | | |
|---|---|---|---|---|---|---|
| Al | 11.3 | 48.4[1] | 13.5 | 13.3 | 24.6 | 11.3 |
| Density | .717 | .752 | .709 | .716 | .682 | .767 |

*PQ zeolite
**2034 DI,
[1]Slurry set up stiff. Added water to spray dry.

|  | Sample ID | | | |
|---|---|---|---|---|
|  | ICB-39 | ICB-40 | ICB-41 | ICB-42 |
| Formulations | | | | |
| ZSM-5 | 40 | 40 | 5* | 5* |
| 2040 NH₄ | 12 | 25 | 3 | 2 |
| 9950 | — | — | 0.25** | 0.25** |
| 830 | — | — | — | — |
| 2050 | — | — | — | — |
| Binder alumina | 4 | 5 | 15 | 10 |
| Zircon | — | — | — | — |
| Clay | 44 | 30 | 77 | 83 |
| CP-5 | — | — | — | — |
| % Binder | 16 | 30 | 18 | 12 |
| Solids | 35 | 36 | 31 | 32 |
| Input Weights | | | | |
| ZSM-5 | 962 | 962 | 56* | 56* |
| 2040 NH₄ | 302 | 625 | 75 | 50 |
| 9950 | — | — | 5.2*** | 5.2*** |
| 830 | — | — | — | — |
| 2050 | — | — | — | — |
| Binder alumina | 53 | 67 | 200 | 133 |
| Zircon | — | — | — | — |
| Clay | 518 | 353 | 906 | 976 |
| CP-5 | — | — | — | — |
| Formic | 13 | 17 | 50 | 33 |
| H₂O | 1087 | 758 | 1975 | 1867 |
| Analytical Data | | | | |
| Al | | | | |
| density | | | | |

*PQ zeolite
**REO,
***Ce(NO₃)₄ soln.

Some specific tests were also initiated on the matrices resulting from our formulations to more precisely determine the concomitant effects of the herein disclosed matrix binder formulations on specific catalyst activities. The initial results of these tests were very encouraging and continuation-in-part patent applications are contemplated to deal with the subject of specific formulations used to enhance the production of specific hydrocarbons.

In any case, the herein disclosed attrition-resistant matrices and the resulting cracking catalyst produced by the present invention clearly may be used to introduce high concentrations of small crystalline (e.g. ZSM-5, low-soda exchanged Y-zeolite, ultra-stable Y-zeolite etc.) catalysts into cracking systems and/or they may be used as catalysts in their own right, particularly in acid catalyzed conversion reactions of the kind generally catalyzed by zeolite catalysts. Hydrocarbon conversion reactions such as cracking, hydrocracking, alkylation, dealkylation, transalkylation, isomerization, polymerization, and aromatization are the most obvious uses for our attrition-resistant matrices; however, their use in other reactions such as the conversion of oxygenates such as methanol or dimethyl ether to hydrocarbons is also contemplated. The conditions employed in such catalytic reactions will be those appropriate to the particular catalyst being used. Thus, while our invention generally has been described in terms of the general discussions, specific examples and preferred embodiments, none of these should be taken individually as a limit upon the inventive concepts which are set forth in the following claims.

Thus having disclosed our invention, we claim:

1. A method for forming an attrition-resistant matrix having up to about 60 weight percent of a catalytic cracking catalyst material comprised of particles having diameters less than about 4 microns, said method comprising:
   (1) mixing a colloidal silica with a mixture of catalytic cracking materials wherein at least one ingredient of said mixture is a catalytic cracking catalyst material comprised of particles having diameters less than about 4 microns, with sufficient water to form a first slurry;
   (2) mixing the first slurry with an acid dispersed alumina to an overall colloidal silica to dispersed alumina ratio of from about 5:1 to about 1:1 by weight for form a second slurry;
   (3) mixing the second slurry with sufficient water to form a resultant, uniform, sprayable formulation;
   (4) spray-drying the sprayable formulation to form microspheroidal matrix binder particles; and
   (5) calcining the matrix binder particles to produce attrition-resistant matrix particles.

2. The method of claim 1 wherein the catalytic cracking catalyst material is selected from the group consisting of ZSM-5, low-soda exchange Y-zeolite and ultra-stable Y-zeolite, the acid dispersed alumina is an amorphous acid dispersed alumina, the and the colloidal silica and acid dispersed alumina constitute from about 3 to about 30 weight percent of the second slurry.

3. The method of claim 1 wherein the colloidal silica is a low sodium, colloidal silica.

4. The method of claim 1 wherein the acid dispersed alumina is of the pseudoboehmite type.

5. The method of claim 1 wherein the acid dispersed alumina is dispersed by an acid selected from the group consisting of a mineral acid and an organic acid.

6. The method of claim 1 wherein a remainder of the catalyst ingredients mixture is kaolin clay.

7. The method of claim 1 wherein between about 1 and about 15 weight percent colloidal zirconia is added with the acid disbursed alumina.

8. The method of claim 1 wherein the catalyst ingredient mixture contains barite.

9. The method of claim 1 wherein the spray-drying is carried out to form microspheroidal matrix binder particles of from about 20 to about 80 microns, average diameter.

10. The method of claim 1 wherein the calcining is carried out between about 800 and 1,500 degrees Fahrenheit for between about 30 and about 100 minutes.

11. A method for forming an attrition-resistant matrix having up to about 60 weight percent of a catalytic cracking catalyst material comprised of particles having diameters less than about 4 microns, said method comprising:
 (1) mixing colloidal silicon with a mixture of catalytic cracking materials at least one ingredient of said mixture is a catalytic cracking catalyst material comprised of particles having diameters less than about 4 microns, with sufficient water to form a first slurry;
 (2) mixing the first slurry with colloidal alumina to an overall colloidal silica to colloidal alumina ratio of from about 5:1 to about ;b 1:1 by weight to form a second slurry;
 (3) mixing the second slurry with sufficient water to form a resultant, uniform, sprayable formuation:
 (4) spray-drying the sprayable formulation to form microspheroidal matrix binder particles; and
 (5) calcining the matrix binder particles to produce attrition-resistant matrix particles.

12. The method of claim 11 wherein the catalytic cracking catalyst material is selected from the group consisting of ZSM-5, low-soda exchanged Y-zeolite and ultra-stable Y-zeolite and the colloidal silica and colloidal alumina constitue from about 3 to about 10 weight percent of the slurry.

13. The method of claim 11 wherein the colloidal silica is a low sodium colloidal silica.

14. The method of claim 11 wherein the colloidal alumina is amorphous in form.

15. The method of claim 11 wherein the colloidal alumina is an amorphous colloidal alumina.

16. The method of claim 11 wherein the colloidal silica and colloidal alumina are about 24% by weight of the attrition-resistant particles.

17. The method of claim 11 wherein the colloidal alumina is introduced in conjunction with kaolin clay.

18. The method of claim 11 wherein a remainder of the catalyst ingredient mixture is kaolin clauy and barite.

19. The method of claim 11 wherein the spray-drying is carried out to form microspheroidal matrix binder particles to from about 20 to about 80 microns, average diameter.

20. The method of claim 11 wherein the calcining is carried out between about 800 and 1,500 degrees Fahrenheit for from about 30 to about 100 minutes.

21. A method for forming an attrition-resistant matrix having up to about 60 weight percent of a catalytic cracking catalyst material comprised of particles having diameters less than about 4 microns, said method comprising:
 (1) mixing a colloidal silicon with a mixture of catalytic cracking materials wherein at least one ingredient of said mixture is a catalytic cracking catalyst material comprised of particles having diameters less than about 4 microns, with sufficient wate to form a first slurry;
 (2) mixing the first slurry with colloidal alumina to an overall colloidal silica to colloidal alumina ratio of from about 5:1 to about 1:1 by weight to form a second slurry;
 (3) mixing the second slurry with sufficient water to form a resultant, uniform, sprayable formulation;
 (4) spray-drying the sprayable formulation to form microspheroidal matrix binder particles; and
 (5) calcining the matrix binder particles to produce attrition-resistant matrix particles.

22. The method of claim 21 wherein the catalytic cracking catalyst material is selected from the groups consisting of ZSM-5, low-soda exchange Y-zeolite and ultra-stable Y-zeolite, and the colloidal silica and colloidal zirconia are in a ratio of from about 5:1 to about 1:1 by weight and the colloidal silica and colloidal zirconia constitute from about 3 to about 30 weight percent of the second slurry.

23. The method of claim 21 wherein the colloidal silica is a low sodium, colloidal silica.

24. The method of claim 21 wherein the colloidal zirconia is from about 5 to about 10 percent of the attrition-resistant matrix particles.

25. The method of claim 21 wherein the colloidal zirconia is introduced for the purpose of triggering the action of a colloidal silica blend.

26. The method of claim 21 wherein the colloidal zirconia is mixed with from about 10% to about 20% kaolin clay prior to their introduction into the first slurry.

27. The method of claim 21 wherein the colloidal zirconia is mixed with from about 5% to about 20% barite.

28. The method of claim 21 wherein between about 5 and about 10 weight percent colloidal zirconia is added with about 5 to about 20% kaolin clay prior to their introduction into the first slurry.

29. The method of claim 21 wherein a second catalyst ingredient is added with the small crystalline ingredient and wherein said second catalyst ingredient is selected from the group consisting of barite and a kaolin clay.

30. The method of claim 21 wherein the spray-drying is carried out to form microspheroidal matrix binder particles of from about 20 to about 80 microns, average diameter.

31. The method of claim 21 wherein the calcining is carried out between about 800 and 1,500 degress Fahrenheit for about 30 to about 100 minutes.

32. An attriction-resistant matrix having up to about 60 weight percent ZSM-5 produced by:
 (1) mixing colloidal silicon with a mixture of catalytic cracking materials at least one ingredient of said mixture is ZSM-5 compound of particles having diameters less than about 4 microns, with sufficient water to form a first slurry;
 (2) mixing the first slurry with colloidal alumina to an overall colloidal silica to colloidal alumina ratio of from about 5:1 to about 1:1 by weight to form a second slurry;

(3) mixing the second slurry with sufficient water to form a resultant, uniform, sprayable formulation;

(4) spray-drying the sprayable formulation to form microspheroidal matrix binder particles; and (5) calcining the matrix binder particles to produce attrition-resistant matrix particles.

33. The matrix of claim 32 wherein catalytic cracking catalyst material is ZSM-5 and the colloidal silica and colloidal alumina are in a ratio of from about 5:1 to about 1:1 by weight.

34. The matrix of claim 32 wherein the colloidal silica is a low sodium, colloidal silica.

35. The matrix of claim 32 whereinn the acid dispersed alumina is amorphous in form.

36. The matrix of claim 31 wherein the acid dispersed alumina is dispersed by the use of formic acid.

37. The matrix of claim 31 wherein the colloidal silica and acid dispersed alumina are about 24% by weight of the attrition-resistant particles.

38. The matrix of claim 32 wherein the remainder of the catalysts ingredient mixture is a kaolin clay.

39. The matrix of claim 32 wherein the spray-drying is carried out to form microspheroidal matrix binder particles of from about 20 to about 80 microns, average diameter.

40. The method of claim 32 wherein the calcining is carried out between about 800 and 1,500 degrees Fahrenheit for from about 30 to about 100 minutes.

41. An attrition-resistant matrix having up to about 60 weight percent ZSM-5 produced by:

(1) mixing colloidal silicon with a mixture of catalytic cracking materials at least one ingredient of said mixture is a catalytic cracking catalyst material comprised of particles having diameters less than about 4 microns, with sufficient water to form a first slurry;

(2) mixing the first slurry with colloidal alumina to an overall colloidal silica to colloidal alumina ratio of from about 5:1 to about 1:1 by weight to form a second slurry;

(3) mixing the second slurry with sufficient water to form a resultant, uniform, sprayable formulation;

(4) spray-drying the sprayable formulation to form microspheroidal matrix binder particles; and (5) calcining the matrix binder particles to produce attrition-resistant matrix particles.

42. The matrix of claim 41 wherein the catalytic cracking catalyst material is selected from the group consisting of ZSM-5, low-soda exchanged Y-zeolite and ultra-stable Y-zerolite, the colloidal silica and colloidal alumina are in a ratio of from about 5:1 to about 1:1 by weight and the colloidal silica and colloidal alumina constitute from about 3 to about 30 weight percent of the second slurry.

43. The matrix of claim 41 wherein the colloidal silica is a low sodium, colloidal silica.

44. The matrix of claim 41 wherein the colloidal alumina is amorphous in form.

45. The matrix of claim 41 wherein the colloidal silica and alumina are about 24% by weight of the attrition-resistant particles.

46. The matrix of claim 41 wherein the remainder of the catalyst ingredient mixture is a kaolin clay.

47. The matrix of claim 41 wherein the spray-drying is carried out to form microspheroidal matrix binder particles of from about 20 to about 80 microns, average diameter.

48. The method of claim 41 wherein the calcining is carried out between about 800 and 1,500 degrees Fahrenheit for from about 30 to about 100 minutes.

* * * * *